Sept. 12, 1950 G. GUANELLA 2,522,368

ANGULAR VELOCITY MODULATION SYSTEM

Filed March 23, 1946

INVENTOR.
GUSTAV GUANELLA

BY

[signature]

ATTORNEY.

Patented Sept. 12, 1950

2,522,368

UNITED STATES PATENT OFFICE 2,522,368

ANGULAR VELOCITY MODULATION SYSTEM

Gustav Guanella, Zurich, Switzerland, assignor to Radio Patents Corporation, New York, N. Y., a corporation of New York Application March 23, 1946, Serial No. 656,564
In Switzerland March 28, 1945

6 Claims. (Cl. 332—21)

The present invention relates to phase or frequency modulation, collectively known as angular velocity modulation, and the main object of the invention is to provide a simplified method of and system for phase-modulating a carrier frequency in accordance with a plurality of signals or signal frequency bands, for multiplex signalling purposes and to secure other advantages and desirable effects. By the use of suitable frequency correcting networks in the signal frequency channels, the obtained phase modulation may be converted into a multiple frequency modulation.

In multi-channel systems for transmitting messages or signals by means of a frequency-modulated carrier, difficulties are encountered in keeping the frequency constant and obtaining a linear modulation of the carrier wave. Systems provided with a frequency control device often do not provide a sufficiently constant center frequency, despite the considerable expense involved in such arrangements. A further disadvantage of multi-channel systems using phase or frequency modulation, is the large frequency multiplication which is required for each channel. This makes it necessary to provide numerous multiplication stages in order to produce a sufficiently wide frequency deviation, so that the inherently favorable transmission properties of frequency modulation are obtained.

The present invention concerns an arrangement for a multi-channel transmission using a phase-modulated carrier and requiring at the most one frequency multiplying device. According to the invention, a single constant-frequency carrier is successively phase-modulated by the individual frequency-shifted messages or signal frequency bands and the resulting modulation product, if necessary, has its phase and frequency multiplied in a common device.

By dividing the phase modulation upon each of the transmission channels, it is possible to obtain a better linear modulation, because the phase angle which has to be controlled may be relatively small. The average transmission frequency may be kept constant by means of a quartz crystal, this being of course practically impossible in ordinary frequency modulation, as the frequency must already be influenced in the oscillatory circuit of the control or master generator. On the other hand, control circuits consisting of a coil and condenser are known to be affected by many external influences, so as to make it often very difficult to maintain the necessary stability with simple means.

Figure 1:
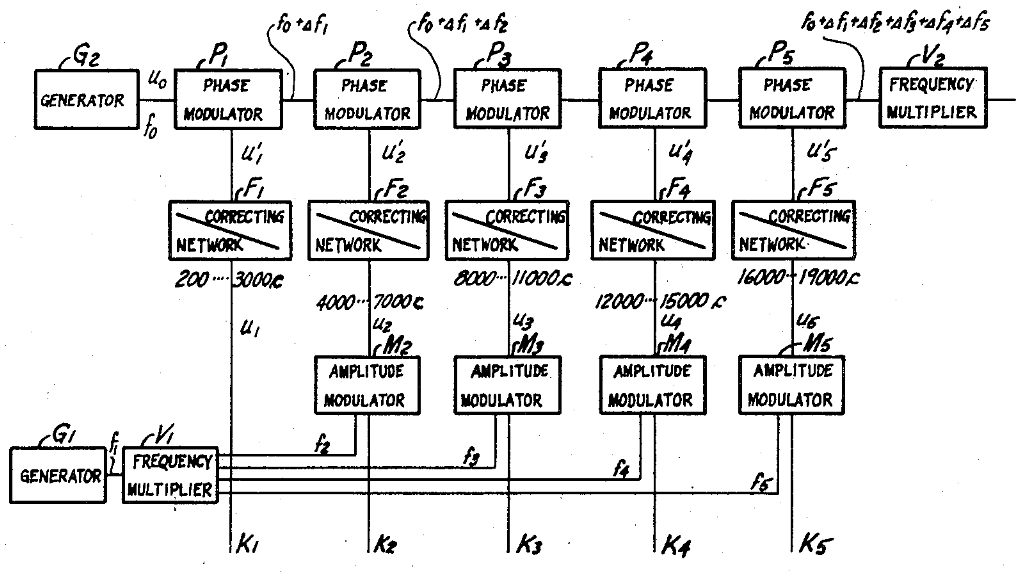
Figure 2A:
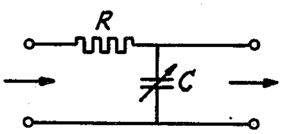
Figure 2B:
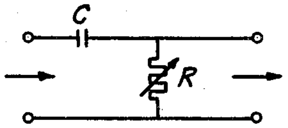
Figure 2C:
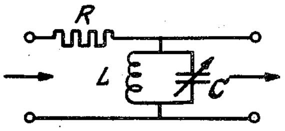
Figure 3:
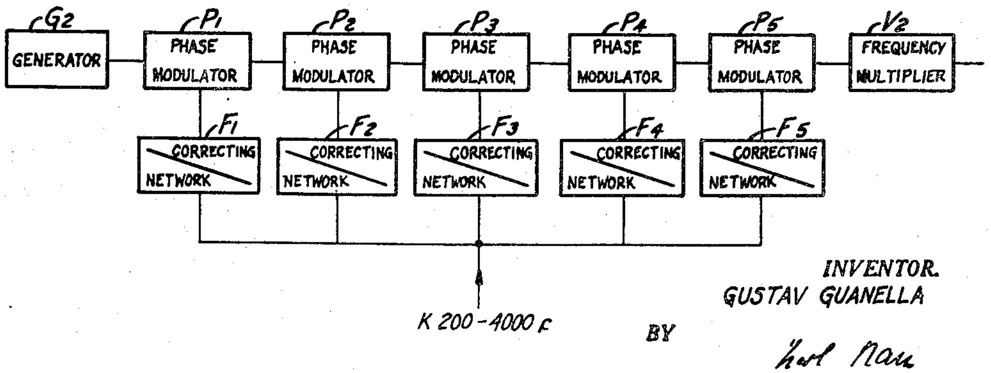

The invention, as to its further objects and novel aspects, will become more apparent from the following detailed description of a few desirable embodiments thereof, taken in reference to the accompanying drawing forming part of this specification, and wherein:

Figure 1 is a block diagram showing a multiplex phase or frequency modulation transmission system constructed in accordance with the principles of the invention;

Figures 2*a*, 2*b* and 2*c* show suitable phase modulating circuits for use in connection with the invention; and Figure 3 illustrates a multiple phase or frequency modulating system according to the invention for the transmission of a single signal frequency or message.

Like reference characters identify like parts in the diffierent views of the drawings.

Referring to Figure 1, it has been assumed that five different signals $K_{1, 2} \ldots K_5$ are to be transmitted, although the invention is not restricted to this number. A special case is also possible where the signal channels are fed in parallel by the same signal. The frequencies of the individual signals are shifted to higher intermediate frequency ranges in a known manner by means of separate carrier or beating frequencies $f_2, f_3 \ldots f_5$ provided for each channel. It is advantageous to transmit only one side band, the other side band and possibly also the carrier being removed by filtering in a manner well understood. The total range of the intermediate frequencies is thus divided into individual frequency bands with fixed limits which only occur once, each frequency band being assigned to a separate signal channel. For telephony or telemetering purposes, the following bands may be chosen by way of example: 200 . . . 3,000, 4,000 . . . 7,000, 8,000 . . . 11,000, 12,000 . . . 15,000, and 16,000 . . . 19,000 cycles per second, as indicated in the drawing. The carrier or beating frequencies $f_2, f_3 \ldots f_5$ for the individual channels may be so selected that their frequency spacing is constant. In this case, individual beating frequencies may be obtained from the fundamental frequency of a generator $G_1$ by multiplication in a frequency multiplier $V_1$. Multiplication of a fundamental frequency offers the advantage that only this fundamental frequency needs to be transmitted to the receiving end. The individual carrier frequencies for filtering out the individual signal bands at the receiving end may also be reproduced by means of frequency multiplication. The signal voltages $u_1 \ldots u_5$ displaced to the respective frequency ranges serve to phase modulate the carrier voltage $u_0$. The latter may thus have a very constant frequency $f_0$, such as obtained from a crystal controlled generator $G_2$. The carrier voltage of frequency $f_0$ is applied to the first phase modulator $P_1$ and then from there to the second and third modulator and so on in multiple-cascade fashion, as shown in the drawing. The carrier frequency thus is passed in succession through all the phase modulators connected in series or cascade and reaches the frequency multiplier $V_2$ as a voltage which has its phase modulated several times. The frequency multiplier is also a phase multiplier and vice versa, since frequency variation and phase variation are intimately related, as is well known. This frequency multiplier, therefore, acts as a common multiplier for all the phase modulators to produce a final transmission signal voltage of a desired phase or frequency deviation. In the example illustrated, the phase modulators are controlled by the control voltages $u_{1'} \ldots u_{5'}$. These control voltages have the same instantaneous frequency as the frequency-shifted signal voltages $u_1 \ldots u_5$. They are obtained from the latter after passing through the frequency correction networks $F_1, F_2 \ldots F_5$. The latter are so constructed that the voltage decreases as the frequency increases as indicated by the slanting lines of the drawing. This frequency correction is necessary, if the phase modulators $P_1$, $P_2 \ldots P_5$ are to produce frequency modulated output signals. If phase modulation is desired, the correcting network may be omitted. The connecting line from modulator $P_1$ to modulator $P_2$ therefore passes a maximum momentary frequency $f_0+\Delta f_1$. $\Delta f_1$ is the frequency range which is at least approximately proportional to the amplitude of the channel voltage $u_1$. An analogous modulator process occurs in all the other channels. Modulator $P_2$ causes a frequency deviation $\Delta f_2$, so that the maximum momentary frequency after the second modulator $P_2$ will be equal to $f_0+\Delta f_1+\Delta f_2$. After passing through all the modulators, the maximum frequency deviation, in the example shown, will be $$f_0+\Delta f_1+\Delta f_2+\Delta f_3+\Delta f_4+\Delta f_5$$

From this summation of the various deviations, it is easily seen that the final effect obtained will be similar to a frequency multiplication. It may be said that with a plurality of signal channels and modulators there is also a multiple change in the frequency. In many cases, this frequency change may satisfy the transmission conditions, so that a frequency multiplication by a special device $V_2$ may be dispensed with, or a comparatively small multiplication may be sufficient for the transmission. This enables a considerable saving in apparatus.

Any known devices such as four-terminal networks may be used in a known manner as phase modulators. Such networks as illustrated in Figs. 2*a* and 2*b* consist of a resistance R and a capacitance C in series. It is sufficient to vary the capacitance in accordance with the control voltage as shown in Fig. 2*a*, for instance by means of electro-mechanical devices or piezo-crystals. The ohmic resistance may also be varied as shown in Fig. 2*b* with the same phase-influencing effect in accordance with the control voltage, such as by means of an electron tube serving as a variable control impedance.

It is also possible to use an arrangement such as is shown in Fig. 2*c* for producing a phase modulation. In this case, the phase is altered by means of an oscillatory circuit, consisting of a coil L and condenser C in series with a resistance R, by influencing the resonance frequency of the parallel-connected inductance L and capacitance C, by means of a controlled reactance tube connected in parallel.

Other kinds of modulation known in the art may be used for the purpose of the invention, the invention not being limited to the arrangements shown, as is understood.

The multiple phase modulation may also be controlled from a single common channel instead of from several individual channels. In this case, with $n$ phase modulators there will be obtained an $n$-fold phase deviation. When intermediate frequency correcting devices are used, frequency modulation is obtainable with such a phase modulator. An arrangement of this type is shown in Fig. 3. From speech channel K, which may cover a frequency range of 200 . . . 4,000 cycles, the modulation voltage is passed over similar frequency correctors $F_1 \ldots F_5$ to the phase modulators $P_1 \ldots P_5$. Any number of modulators may be used. The arrangement operates like a multiple phase modulation, if the correcting devices $F_1 \ldots F_5$ are omitted. Also in this case, an additional phase and frequency multiplier $V_2$ may be provided for further increase of the phase and frequency deviation.

Since the phase modulators may be connected in series, it is possible to separate them locally. This offers the great advantage that signal channels can be connected at any point of a transmission line. The transmission of the messages may be by means of wire conductors or by wireless. The only condition in this case is that at the location of the individual phase modulators, the frequency $f_0$ of the generator G and the multiplied carrier beating frequency assigned to the respective signal channels are produced afresh for the required frequency band displacement. The frequency $f_0$ may be synchronized with the original frequency $f_0$ of the basic generator by means of known synchronizing devices.

I claim:

1. A multiplex modulation system comprising a plurality of phase modulators each having a carrier frequency and signal frequency input and an output circuit, means for connecting said modulators in cascade as regards the carrier frequency, a constant frequency carrier oscillator feeding the input of the first modulator, a plurality of low frequency signal sources, heterodyning means for shifting the frequency bands of said low frequency sources into separate and different frequency ranges, and means for applying each of the shifted signal bands to a separate signal frequency input of said modulators.

2. A multiplex modulation system comprising a plurality of phase modulators each having a carrier frequency and signal frequency input and an output circuit, means for connecting said modulators in cascade as regards the carrier frequency, a constant frequency carrier oscillator feeding the input of the first modulator, a plurality of low frequency signal sources, heterodyning means for shifting the frequency bands of said low frequency sources into separate and different frequency ranges, means for applying each of the shifted signal bands to a separate signal frequency input of said modulators, and frequency correcting means interposed between each of said sources and its respective modulator to obtain a resultant modulated wave from the output of the last modulator.

3. A multiplex modulation system comprising a plurality of phase modulators each having a carrier frequency and signal frequency input and an output circuit, means for connecting said modulators in cascade as regards the carrier frequency, a constant frequency carrier oscillator feeding the input of the first modulator, a plurality of low frequency signal sources, a heterodyning oscillator and frequency multiplier to produce a plurality of beating oscillations at equally spaced frequency intervals, a plurality of frequency converters for combining each of said beating oscillations with a separate low frequency signal to produce different frequency-shifted signal bands, and further means for applying each of the shifted signal frequency bands to the signal input of a separate one of said phase modulators.

4. A multiplex modulation system comprising a plurality of phase modulators each having a carrier freqency and signal frequency input and an output circuit, means for connecting said modulators in cascade as regards the carrier frequency, a constant frequency carrier oscillator feeding the input of the first modulator, a plurality of low frequency signal sources, a heterodyning oscillator and frequency multiplier to produce a plurality of beating oscillations at equally spaced frequency intervals, a plurality of frequency converters for combining each of said beating oscillations with a separate low frequency signal to produce different freqency-shifted signal bands, further means for applying each of the shifted signal frequency bands to the signal input of a separate one of said phase modulators, and frequency correcting means interposed between each of said signal sources and the respective modulators to obtain a resultant frequency modulated wave from the output of the last modulator.

5. A multiplex modulation system comprising a plurality of phase modulators each having a carrier frequency and signal frequency input and an output circuit, means for connecting said modulators in cascade as regards the carrier frequency, a constant frequency carrier oscillator feeding the input of the first modulator, a plurality of low frequency signal sources, heterodyning means for shifting the frequency bands of said low frequency sources into separate and different frequency ranges, means for applying each of the shifted signal bands to a separate signal frequency input of said modulators, and a common frequency multiplier connected to the output of the last modulator.

6. A multiplex modulation system comprising a plurality of phase modulators each having carrier frequency and signal frequency input circuits and an output circuit, means for connecting said modulators in cascade as regards to carrier frequency, a constant frequency carrier signal generator feeding the input of the first modulator, a plurality of modulating sources supplying low frequency signals encompassing separate ranges of component frequencies, and means for connecting each of said modulating sources to the signal input circuit of a separate one of said modulators.

GUSTAV GUANELLA.

REFERENCES CITED

The following references are of record in the file of this patent:

UNITED STATES PATENTS

| Number | Name | Date |
|---|---|---|
| 1,633,100 | Heising | June 21, 1927 |
| 2,188,500 | Curtis | Jan. 30, 1940 |
| 2,358,382 | Carlson | Sept. 19, 1944 |
| 2,421,727 | Thompson | June 3, 1947 |
| 2,436,834 | Stodola | Mar. 2, 1948 |